US012733070B2

(12) United States Patent
Zhang et al.

(10) Patent No.: US 12,733,070 B2
(45) Date of Patent: Sep. 8, 2026

(54) SESSION SETUP METHOD AND APPARATUS

(71) Applicant: HUAWEI TECHNOLOGIES CO., LTD., Shenzhen (CN)

(72) Inventors: Haisen Zhang, Beijing (CN); Bin Xu, Beijing (CN); Bingzhao Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 18/541,029

(22) Filed: Dec. 15, 2023

(65) Prior Publication Data

US 2024/0114592 A1 Apr. 4, 2024

Related U.S. Application Data

(63) Continuation of application No. PCT/CN2022/096841, filed on Jun. 2, 2022.

(30) Foreign Application Priority Data

Jun. 16, 2021 (CN) ......................... 202110665904.6

(51) Int. Cl.
*H04W 76/40* (2018.01)
*H04W 76/10* (2018.01)

(52) U.S. Cl.
CPC ........... *H04W 76/40* (2018.02); *H04W 76/10* (2018.02)

(58) Field of Classification Search
CPC ..... H04W 76/40; H04W 76/10; H04W 72/30; H04W 4/06; H04W 76/11; H04W 84/042;
(Continued)

(56) References Cited

U.S. PATENT DOCUMENTS

2015/0119023 A1 4/2015 Wang et al.
2019/0124623 A1 4/2019 Xu et al.
(Continued)

FOREIGN PATENT DOCUMENTS

KR 20160009038 A 1/2016
WO 2016124983 A1 8/2016

OTHER PUBLICATIONS

Extended European Search Report issued in corresponding European Application No. 22824069.3, dated Oct. 18, 2024, pp. 1-8.
(Continued)

*Primary Examiner* — Shawn D Miller
(74) *Attorney, Agent, or Firm* — HAUPTMAN HAM, LLP

(57) ABSTRACT

A method includes obtaining a first session setup request from a first core network device. The first session setup request is usable to request to set up a first session corresponding to a first multicast broadcast service. The first session setup request includes a first identifier corresponding to the first multicast broadcast service. The method further includes determining, based on the first identifier, that a multicast broadcast service corresponding to the first session is the same as a multicast broadcast service corresponding to a second session, and using an air interface resource corresponding to the second session as an air interface resource corresponding to the first session. The second session is a session set up of a second core network device.

20 Claims, 7 Drawing Sheets

(58) Field of Classification Search
CPC ............... H04L 65/1016; H04L 12/189; H04L 65/1069; H04L 65/611; H04L 12/1886
See application file for complete search history.

(56) References Cited

U.S. PATENT DOCUMENTS

| | | | | |
|---|---|---|---|---|
| 2019/0158985 | A1* | 5/2019 | Dao | H04W 28/04 |
| 2022/0272662 | A1* | 8/2022 | Kim | H04W 72/044 |
| 2023/0179958 | A1* | 6/2023 | Chen | H04W 64/00 370/329 |
| 2023/0300681 | A1* | 9/2023 | Liu | H04W 36/38 370/331 |

OTHER PUBLICATIONS

3GPP TSG SA WG5 Meeting 137-e S5-213403,"Discussion on MOCN NG-RAN network sharing", ZTE, electronic meeting, online, May 10-19, 2021, total 4 pages.
Korean Office Action issued in corresponding Korean Application No. 10-2024-7000945, dated May 9, 2026.

* cited by examiner

SESSION SETUP METHOD AND APPARATUS

CROSS-REFERENCE TO RELATED APPLICATIONS

This application is a continuation of International Application No. PCT/CN2022/096841, filed on Jun. 2, 2022, which claims priority to Chinese Patent Application No. 202110665904.6, filed on Jun. 16, 2021, the disclosures of the aforementioned applications are hereby incorporated by reference in their entireties.

TECHNICAL FIELD

This application relates to the field of communication technologies, and in particular, to a session setup method and an apparatus.

BACKGROUND

In a 5G new radio (new radio, NR) system, a base station may send multicast broadcast services (multicast broadcast services, MBSs) to a plurality of terminal devices. The MBS is mainly applicable to scenarios such as live broadcasting and scheduled program playback. The MBS is sent to the terminal devices only in a point-to-multipoint (point-to-multipoint, PTM) manner. The base station establishes a dedicated bearer for the MBS, and all terminal devices interested in the service may receive the MBS by using the bearer. Therefore, the MBS can reduce air interface resources, and improve spectrum utilization and transmission efficiency.

A network co-construction and sharing technology, namely, radio access network (radio access network, RAN) sharing (sharing), may help avoid repeated construction of network infrastructure. The RAN sharing means that one RAN may be connected to core network nodes of a plurality of operators. The plurality of operators may collaborate with each other to co-construct a RAN, or one operator may construct a RAN independently and other operators rent the RAN network of the operator.

In a scenario of RAN sharing, how to reduce air interface resources used by an MBS and improve transmission efficiency is an urgent problem to be resolved.

SUMMARY

One or more embodiments of the present application provide a session setup method and an apparatus, to reduce air interface resources used by a multicast broadcast service, and improve transmission efficiency.

According to a first aspect, this application provides a communication method. The method is applicable to a scenario in which a session setup process is performed between an access network device and a terminal device. The method is executed by the access network device or a chip or a module in the access network device. Herein, an example in which the method is executed by the access network device is used for description. The method includes: the access network device obtains a first session setup request from a first core network device, where the first session setup request is used to request to set up a first session corresponding to a first multicast broadcast service, and the first session setup request includes a first identifier corresponding to the first multicast broadcast service; and the access network device determines, based on the first identifier, that a multicast broadcast service corresponding to the first session is the same as a multicast broadcast service corresponding to a second session, and uses an air interface resource corresponding to the second session as an air interface resource corresponding to the first session, to be specific, the air interface resource corresponding to the first session is the same as the air interface resource corresponding to the second session, where the second session is a session set up with a second core network device.

In some embodiments provided in this application, when it is determined that the first session that the first core network device requests to set up and the second session correspond to a same multicast broadcast service, the air interface resource corresponding to the second session may be used as the air interface resource corresponding to the first session, so that the air interface resource corresponding to the first session is the same as the air interface resource corresponding to the second session. Therefore, air interface resources are reduced, and resource utilization and transmission efficiency are improved.

In some embodiments, a data transmission channel between the access network device and the first core network device in the first session is the same as a data transmission channel between the access network device and the second core network device in the second session.

In some embodiments, when it is determined that the first session that the first core network device requests to set up and the second session correspond to a same multicast broadcast service, the data transmission channel between the access network device and the first core network device is the same as the data transmission channel between the access network device and the second core network device, so that service data of the first multicast broadcast service may be transmitted by using a same data transmission channel, and only one set of resources is used between different core network devices and access network devices. Therefore, resource utilization and transmission efficiency are improved.

In some embodiments, a second configuration message is sent in a second public land mobile network in which the second core network device is located, where the second configuration message includes a first user identifier, and the first user identifier is used to scramble scheduling information of service data of the first multicast broadcast service. A first configuration message is sent in a first public land mobile network in which the first core network device is located, where the first configuration message includes the first user identifier.

In some embodiments, the first configuration message and the second configuration message include a same first user identifier, so that the service data of the first multicast broadcast service may be scheduled to a terminal device in the first public land mobile network and a terminal device in the second public land mobile network by using the first user identifier, to improve resource utilization.

In some embodiments, the first configuration message and the second configuration message further include configuration information of a first channel. The first channel is used to transmit the service data of the first multicast broadcast service, and the first channel is configured in a process of setting up the second session.

The configuration information of the first channel is carried, so that the terminal device may determine information such as a time-frequency resource of the first channel. Therefore, efficiency of receiving service data by the terminal device is improved and power consumption of the terminal device is reduced.

In some embodiments, a first session setup response is sent to the first core network device. The first session setup response includes first indication information, and the first indication information indicates that the multicast broadcast service corresponding to the first session is the same as the multicast broadcast service corresponding to the second session.

According to the first indication information, the first core network device no longer transmits the service data of the first multicast broadcast service to the access network device. Therefore, resources between the access network device and the first core network device are reduced, and transmission efficiency is improved.

In some embodiments, the first identifier is a first service identifier corresponding to the first multicast broadcast service in the first public land mobile network in which the first core network device is located, a first network service identifier, or a first internet protocol IP multicast group address.

In some embodiments, the determining, based on the first identifier, that a multicast broadcast service corresponding to the first session is the same as a multicast broadcast service corresponding to a second session includes: if the first identifier matches a second identifier, determining that the first session and the second session correspond to a same multicast broadcast service, where the second identifier is from a second session setup request, and the second session setup request is used to request to set up the second session.

In some embodiments, before the determining, based on the first identifier, that a multicast broadcast service corresponding to the first session is the same as a multicast broadcast service corresponding to a second session, the method further includes: determining that the first identifier is within an identifier allocation range, where the identifier allocation range is preconfigured.

In some embodiments, when obtaining the first identifier, the access network device may first determine whether the first identifier is within the identifier allocation range. If it is determined that the first identifier is within the identifier allocation range, then whether the first identifier matches the second identifier is determined. In this way, it may be quickly determined whether a session corresponding to the first identifier is set up, to improve efficiency.

In some embodiments, the determining, based on the first identifier, that a multicast broadcast service corresponding to the first session is the same as a multicast broadcast service corresponding to a second session includes: if it is determined, based on a first mapping relationship, that the first multicast broadcast service corresponding to the first identifier is the same as a second multicast broadcast service corresponding to a second identifier, determining that the first session and the second session correspond to a same multicast broadcast service, where the first mapping relationship includes a mapping relationship between a multicast broadcast service and an identifier in public land mobile networks of different operators, the second identifier is from a second session setup request, and the second session setup request is used to request to set up the second session.

In some embodiments, the first mapping relationship is from the first core network device or the second core network device; or the first mapping relationship is determined by an access network device based on the relationship between the multicast broadcast service and the identifier in the public land mobile networks of different operators.

In some embodiments, before the determining, based on the first identifier, that a multicast broadcast service corresponding to the first session is the same as a multicast broadcast service corresponding to a second session, the method further includes: determining that the first mapping relationship includes the first identifier.

In some embodiments, when obtaining the first identifier, the access network device may first determine whether the first mapping relationship includes the first identifier. If it is determined that the first identifier is in the first mapping relationship, then whether the first identifier matches the second identifier is determined based on the first mapping relationship. In this way, it may be quickly determined whether a session corresponding to the first identifier is set up, to improve efficiency.

In some embodiments, the first identifier is a first public identifier allocated by a service server to the first multicast broadcast service.

In some embodiments, the determining, based on the first identifier, that a multicast broadcast service corresponding to the first session is the same as a multicast broadcast service corresponding to a second session includes: if it is determined that the first public identifier is the same as a second public identifier, determining that the first session and the second session correspond to a same multicast broadcast service, where the second public identifier is from a second session setup request, and the second session setup request is used to request to set up the second session.

In some embodiments, if it is determined that the second core network device stops transmitting the service data of the first multicast broadcast service, a first message is sent to the first core network device, where the first message indicates to set up the first session; a second message from the first core network device is received, where the second message is used to request to re-set up the first session; and a third message is sent to the first core network device, where the third message is used to respond to the second message.

In some embodiments, the first message includes a size of a data packet of sent multicast service data; and/or the first message includes an end marker of a last data packet of sent multicast service data.

According to a second aspect, this application further provides a communication apparatus. The communication apparatus implements any method provided in the first aspect. The communication apparatus may be implemented by hardware, or may be implemented by executing corresponding software by hardware. The hardware or the software includes one or more units or modules corresponding to the function.

In some embodiments, the communication apparatus includes: a processor. The processor is configured to support the communication apparatus in performing a corresponding function in the foregoing method. The communication apparatus may further include a memory. The memory may be coupled to the processor, and the memory stores program instructions and data that are necessary for the communication apparatus. In some embodiments, the communication apparatus further includes an interface circuit. The interface circuit is configured to support communication between the communication apparatus and another device.

In some embodiments, the communication apparatus may be an access network device, or a chip or a module in the access network device.

In some embodiments, the communication apparatus includes corresponding functional modules, respectively configured to implement the steps in the method. The function may be implemented by hardware, or may be implemented by executing corresponding software by hardware. The hardware or the software includes one or more modules corresponding to the function.

In some embodiments, a structure of the communication apparatus includes a processing unit and a communication unit. These units may perform corresponding functions in the method examples. For details, refer to the descriptions in the method according to the first aspect. Details are not described herein.

According to a third aspect, this application provides a communication method. The method is applicable to a scenario in which a session setup process is performed between an access network device and a terminal device. The method is executed by the first core network device or a chip or a module in the first core network device. Herein, an example in which the method is executed by the first core network device is used for description. The method includes: a first core network device sends a first session setup request to an access network device, where the first session setup request is used to request to set up a first session corresponding to a first multicast broadcast service, and the first session setup request includes a first identifier corresponding to the first multicast broadcast service; the first core network device receives a first session setup response from the access network device, where the first session setup response includes first indication information, and the first indication information indicates that a multicast broadcast service corresponding to the first session is the same as a multicast broadcast service corresponding to a second session; and the first core network device determines not to send service data of the first multicast broadcast service to the access network device.

In some embodiments provided in this application, when determining, based on the first indication information, that the multicast broadcast service corresponding to the first session is the same as the multicast broadcast service corresponding to the second session, the first core network device no longer transmits the service data of the first multicast broadcast service to the access network device. Therefore, resources between the access network device and the first core network device are reduced, and transmission efficiency is improved.

In some embodiments, a data transmission channel between the access network device and the first core network device in the first session is the same as a data transmission channel between the access network device and the second core network device in the second session.

In some embodiments, the method further includes: receiving a first message from the access network device, where the first message indicates to set up the first session; and sending a second message to the access network device, where the second message is used to request to re-set up the first session.

In some embodiments, the method further includes: receiving a third message from the access network device, where the third message is used to respond to the second message.

In some embodiments, the first message includes a size of a data packet of sent multicast service data; and/or the first message includes an end marker of a last data packet of sent multicast service data.

In some embodiments, the first identifier is a first service identifier corresponding to the first multicast broadcast service in a first public land mobile network in which the first core network device is located, a first network service identifier, or a first internet protocol IP multicast group address.

In some embodiments, the first identifier is a first public identifier allocated by a service server to the first multicast broadcast service.

According to a fourth aspect, this application further provides a communication apparatus. The communication apparatus implements any method provided in the second aspect. The communication apparatus may be implemented by hardware, or may be implemented by executing corresponding software by hardware. The hardware or the software includes one or more units or modules corresponding to the function.

In some embodiments, the communication apparatus includes: a processor. The processor is configured to support the communication apparatus in performing a corresponding function in the foregoing method. The communication apparatus may further include a memory. The memory may be coupled to the processor, and the memory stores program instructions and data that are necessary for the communication apparatus. In some embodiments, the communication apparatus further includes an interface circuit. The interface circuit is configured to support communication between the communication apparatus and another device.

In some embodiments, the communication apparatus may be a core network device, or a chip or a module in the core network device.

In some embodiments, the communication apparatus includes corresponding functional modules, respectively configured to implement the steps in the method. The function may be implemented by hardware, or may be implemented by executing corresponding software by hardware. The hardware or the software includes one or more modules corresponding to the function.

In some embodiments, a structure of the communication apparatus includes a processing unit and a communication unit. These units may perform corresponding functions in the method examples. For details, refer to the descriptions in the method according to the second aspect. Details are not described herein.

According to a fifth aspect, a communication apparatus is provided. The communication apparatus includes a processor and an interface circuit, and in some embodiments, further includes a memory. The interface circuit is configured to receive a signal from another communication apparatus other than the communication apparatus, and transmit the signal to the processor, or send a signal the processor to another communication apparatus other than the communication apparatus. The processor is configured to execute a computer program or instructions stored in the memory, to implement the method in any possible implementation of the first aspect.

According to a sixth aspect, a communication apparatus is provided. The communication apparatus includes a processor and an interface circuit, and in some embodiments, further includes a memory. The interface circuit is configured to receive a signal from another communication apparatus other than the communication apparatus, and transmit the signal to the processor, or send a signal from the processor to another communication apparatus other than the communication apparatus. The processor is configured to execute a computer program or instructions stored in the memory, to implement the method in any possible implementation of the second aspect.

According to a seventh aspect, a computer-readable storage medium is provided. The computer-readable storage medium stores a computer program or instructions, and when the computer program or the instructions are run on a computer, the computer is enabled to implement the method in any possible implementation of the first aspect.

According to an eighth aspect, a computer-readable storage medium is provided. The computer-readable storage medium stores a computer program or instructions, and when the computer program or the instructions are run on a computer, the computer is enabled to implement the method in any possible implementation of the second aspect.

According to a ninth aspect, a computer program product storing computer-readable instructions is provided. When the computer-readable instructions are run on a computer, the computer is enabled to implement the method in any possible implementation of the first aspect.

According to a tenth aspect, a computer program product storing computer-readable instructions is provided. When the computer-readable instructions are run on a computer, the computer is enabled to implement the method in any possible implementation of the second aspect.

According to an eleventh aspect, a chip is provided. The chip includes a processor, and may further include a memory. The processor is configured to execute a computer program or instructions stored in the memory, to enable the chip to implement the method in any possible implementation of the first aspect.

According to a twelfth aspect, a chip is provided. The chip includes a processor, and may further include a memory. The processor is configured to execute a computer program or instructions stored in the memory, to enable the chip to implement the method in any possible implementation of the second aspect.

According to a thirteenth aspect, a communication system is provided. The system includes the apparatus (for example, the access network device) according to the second aspect and the apparatus (for example, the core network device) according to the fourth aspect.

DETAILED DESCRIPTION

Figure 1:
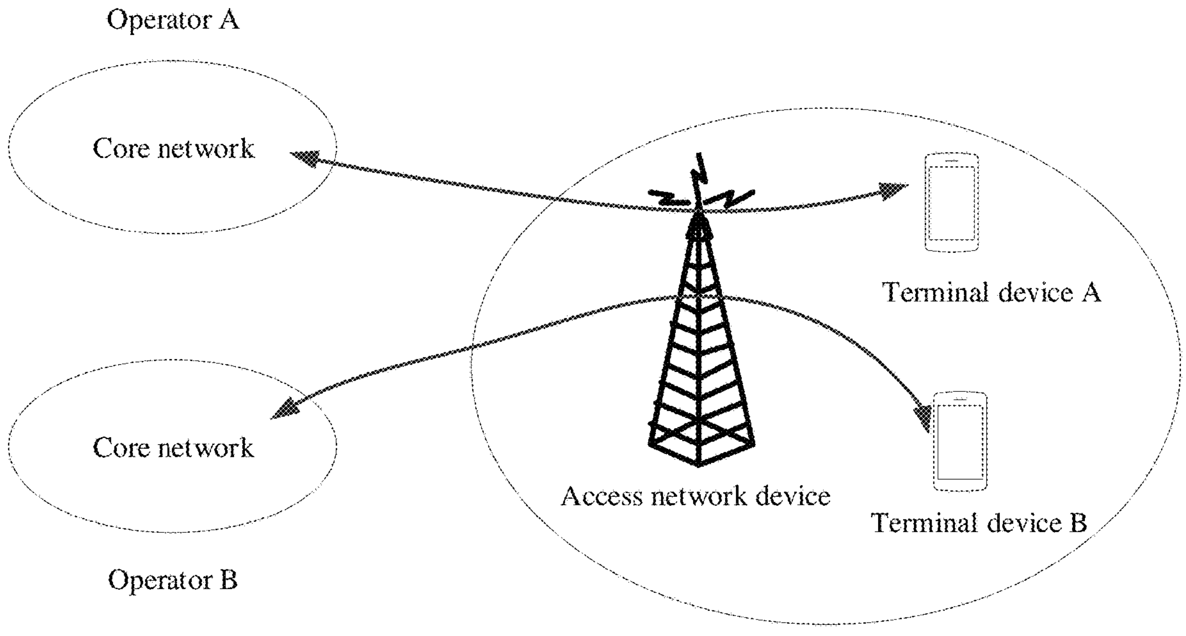
FIG. 1 is a schematic diagram of a network architecture applicable to this application.

The following describes embodiments of this application in detail with reference to the accompanying drawings of this specification.

Embodiments of this application may be applied to various mobile communication systems, for example, a new radio (new radio, NR) system, a global system of mobile communication (global system of mobile communication, GSM), a long term evolution (long term evolution, LTE) system, a future communication system, and another communication system. This is not limited herein.

In embodiments of this application, interaction among a terminal device, an access network device, and a core network device is used as an example for description. It should be noted that the method provided in embodiments of this application may be applied not only to interaction between a terminal device and a network side, but also to interaction between any two devices, for example, to device-to-device (device-to-device, D2D) communication. This is not limited in embodiments of this application.

In embodiments of this application, the terminal device may be referred to as a terminal for short, and is a device having a wireless transceiver function or a chip that may be disposed in the device. The terminal device may alternatively be referred to as user equipment (user equipment, UE), an access terminal, or the like. In actual application, the terminal device in embodiments of this application may be a mobile phone (mobile phone), a tablet computer (Pad), a computer with a wireless transceiver function, a virtual reality (virtual reality, VR) terminal, an augmented reality (augmented reality, AR) terminal, a wireless terminal in industrial control (industrial control), and the like. In embodiments of this application, an apparatus configured to implement functions of the terminal device may be a terminal device, or an apparatus, for example, a chip system, that can support the terminal device in implementing the functions. The apparatus may be installed in the terminal device, or may be matched with the terminal device for use.

The access network device may be a radio access device in various standards in a wireless network. For example, the access network device may be a radio access network (radio access network, RAN) node that connects a terminal device to the wireless network, and may also be referred to as a RAN device or a base station. Examples of some access network devices are: a next generation NodeB (generation NodeB, gNodeB), a transmission and reception point (transmission reception point, TRP), an evolved NodeB (evolved NodeB, eNB), a radio network controller (radio network controller, RNC), and the like. In a network structure, the access network device may include a central unit (central unit, CU) node or a distributed unit (distributed unit, DU) node, or include the CU node and the DU node. When the access network device includes a CU and a DU, a plurality of DUs may be controlled by one CU in a centralized manner. In embodiments of this application, an apparatus configured to implement functions of the access network device may be an access network device, or an apparatus, for example, a chip system, that can support the access network device in implementing the functions. The apparatus may be installed in the access network device, or may be matched with the access network device for use.

The core network device may be a device configured to manage access and mobility of the terminal device, for example, may be an access and mobility management function (Access and Mobility Management Function, AMF) network element, a session management function (Session Management Function, SMF) network element, a multicast broadcast (multicast broadcast, MB)-SMF network element, a mobility management entity (mobility management entity, MME) network element, or the like. This is not limited in this application.

This application may be applied to a RAN sharing scenario. In the RAN sharing scenario, a radio access network or a radio access network and a part of a core network may be shared to a plurality of operators. There are a plurality of architectures for RAN sharing, and this application mainly relates to a multi-operator core network (multi-operator core network, MOCN) architecture.

Specifically, FIG. 1 is a schematic diagram of a network architecture applicable to this application. In FIG. 1, one RAN may be connected to core network nodes of at least two operators. In FIG. 1, an operator A and an operator B are used as an example for description. In the network architecture shown in FIG. 1, a plurality of operators share an access network device and a cell of the access network device, but each operator has an independent core network. The access network device establishes an S1 connection to the core network of each operator, and the access network device may provide a service for terminal devices of the plurality of operators. In this sharing manner, the core network is independent. Configuration management, alarm management, and performance indicators need to be managed by a main operator. Some of the performance indicators may distinguish between public land mobile networks (public land mobile networks, PLMNs) for monitoring. A feature cannot be deployed for the configuration management, the alarm management, and the performance indicator separately. The access network device is fully shared, and one or more carriers of different operators are shared, to form a shared carrier with a continuous large bandwidth, so that infrastructure and device costs may be reduced.

Figure 2:
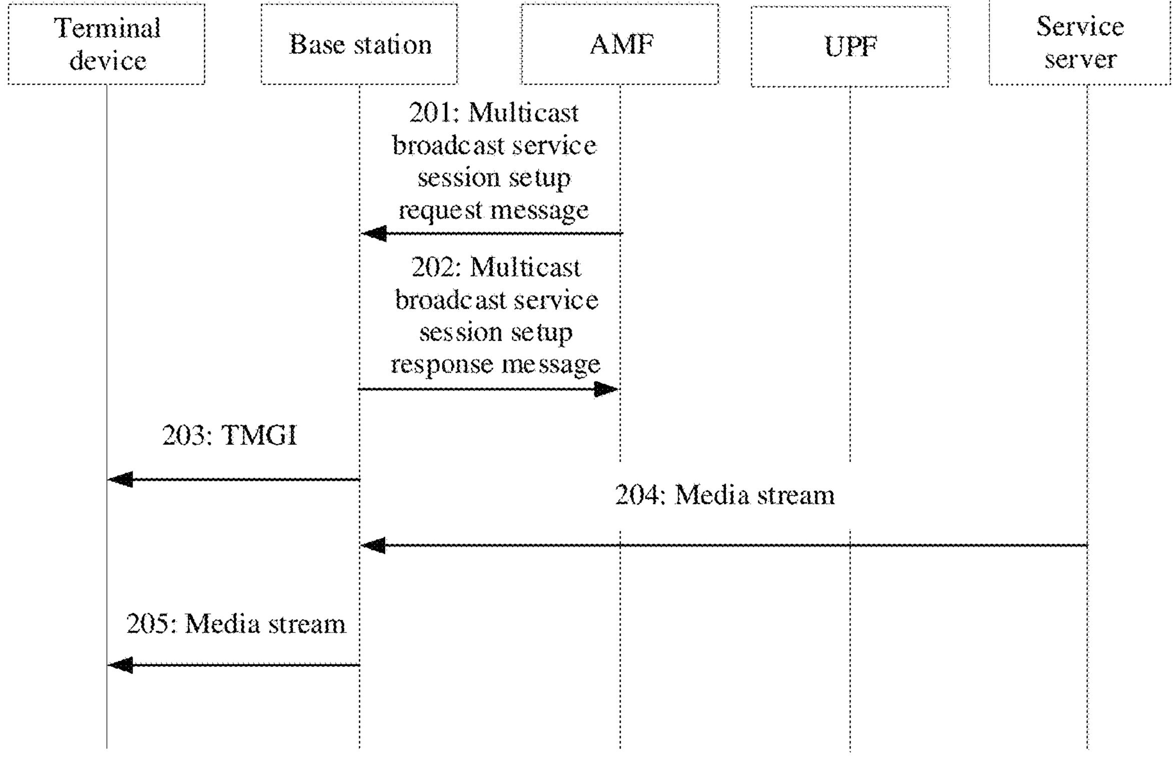
FIG. 2 is a schematic diagram of a multicast broadcast service session setup process.

In a RAN sharing scenario, a multicast broadcast service process is the same as a process in a RAN non-sharing scenario. Specifically, as shown in FIG. 2, a multicast broadcast service session setup process may include the following procedures:

S201: An AMF sends a multicast broadcast service session setup request (MBS session setup request) message to a base station.

The multicast broadcast service session setup request message may include a temporary mobile group identity (temporary mobile group identity, TMGI) and quality of service (quality of service, QoS) profile (profile).

The TMGI is allocated by a core network side. For example, in a 5G system, the TMGI may be allocated by an SME.

In some embodiments, the multicast broadcast service session setup request message may further include an internet protocol (internet protocol, IP) multicast group address.

S202: The base station sends a multicast broadcast service session setup response message to the AMF.

After receiving the multicast broadcast service session setup request message, the base station may create an MBS session context (session context) (if no session context exists), and store the TMGI and the QoS profile in the MBS session context.

If the base station decides to perform multicast broadcast (multicast broadcast, MB)-N3 multicast transmission (and the multicast broadcast service session setup request message includes the IP multicast group address), the base station joins the IP multicast group.

If the base station decides to perform MB-N3 point-to-point (point-to-point, PTP) transmission (or the multicast broadcast service session setup request message does not include the IP multicast group address), the base station provides a downlink general packet radio service (general packet radio service, GPRS) tunneling protocol user plane (GPRS tunnelling protocol user plane, GTP-U) tunnel (tunnel) address.

The multicast broadcast service session setup response message sent by the base station to the AMF may include the TMGI and the GTP-U address (when the base station determines to perform the MB-N3 PTP transmission). In this case, an MBS session is successfully set up.

After receiving the multicast broadcast service session setup response message, the AMF may send information related to the MBS session to another network element in the core network. A specific process is not described in detail again.

S203: The base station sends, to a terminal device by using a wireless interface, a TMGI corresponding to an MBS.

The base station may further send a group mobile subscriber identity (group radio network temporary identifier, G-RNTI), and the G-RNTI may be used to scramble scheduling information of service data of the multicast broadcast service.

S204: The base station receives a media stream of the MBS from the core network through the NB-N3 multicast transmission or PTP transmission.

For example, the base station receives a media stream from a user plane function (user plane function, UPF), that is, service data. The service data is sent by a service server to the UPF.

S205: The base station sends the media stream of the MBS to the terminal device in a point-to-multipoint (point-to-multipoint, PTM) manner.

In addition, in a 5G MBS, an MBS service identifier generally identifies an MBS service. To be specific, each MBS service has a unique MBS service identifier for representation. There is a one-to-one mapping relationship between the MBS service identifier and an MBS session identifier. Therefore, the MBS session identifier may also be used to indicate the MBS service indicated by the MBS service identifier.

In some embodiments, the MBS session identifier may be marked by using an IP multicast source address or the TMGI. The TMGI includes a PLMN identifier and a service identifier. The PLMN identifier represents a specific PLMN (public land mobile network) to which the TMGI belongs, and the service identifier is used to mark a specific multicast broadcast service in the PLMN.

In this embodiment of this application, the multicast broadcast service includes a multicast service and a broadcast service. Specifically, the multicast broadcast service may be a multimedia broadcast multicast service (multimedia broadcast multicast service, MBMS) or an evolved multimedia broadcast multicast service (evolved multimedia broadcast multicast service, eMBMS) in an LTE system, or may be an MBS in an NR system. This is not limited in this embodiment of this application. In a specific implementation, an application corresponding to the multicast broadcast service may be a television channel broadcast service, a vehicle to everything (vehicle to everything, V2X) alarm service, and the like.

Figure 3:
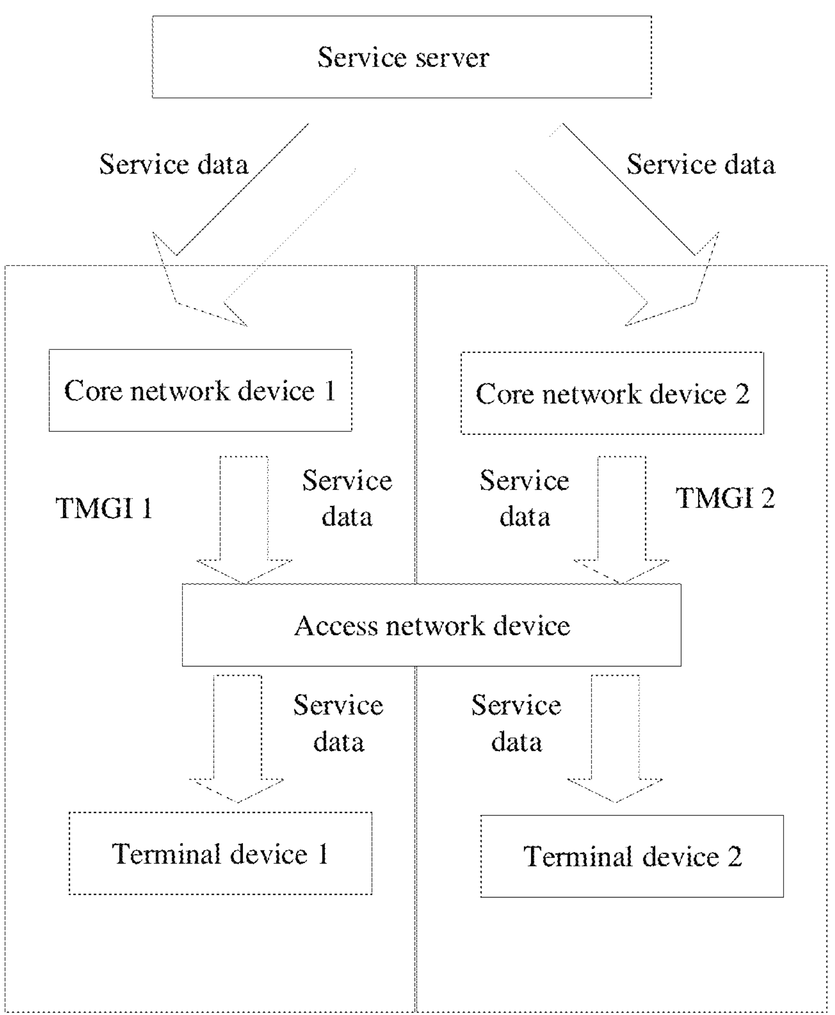
FIG. 3 is a schematic diagram of service data transmission according to an embodiment of this application.

Further, with reference to the foregoing description, in the RAN sharing scenario, when a same service server sends the multicast broadcast service through different operators, CNs corresponding to different operators independently allocate TMGIs to each other. As shown in FIG. 3, an access network device is shared by a PLMN 1 of an operator 1 and a PLMN 2 of an operator 2. When a same service server sends a multicast broadcast service by using both a network of the operator 1 and a network of the operator 2, a core network device 1 of the operator 1 allocates a TMGI 1 to the multicast broadcast service, and a core network device 2 of the operator 2 allocates a TMGI 2 to the multicast broadcast service. In a RAN sharing scenario, the access network device cannot identify whether a service corresponding to the TMGI 1 and a service corresponding to the TMGI 2 are same services. The access network device may allocate different resources to the multicast broadcast service in the two networks. The access network device may broadcast service data of the multicast broadcast service by using the resource allocated in the PLMN 1, and broadcast service data of the multicast broadcast service by using the resource allocated in the PLMN 2.

Therefore, this application provides a method, so that the access network device may identify whether services corresponding to a plurality of TMGIs are a same service, and allocate a same transmission resource to the same service. Therefore, transmission resources are reduced, and resource utilization and transmission efficiency are improved.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

In this application, interaction among the core network device, the access network device, and the terminal device is used as an example for description. An operation performed by the core network device may also be performed by a chip or a module in the core network device, an operation performed by the access network device may also be performed by a chip or a module in the access network device, and an operation performed by the terminal device may also be performed by a chip or a module in the terminal device.

In this embodiment of this application, the access network device is an access network device shared by a first core network device and a second core network device. An example in which a first session is set up between the first core network device and the access network device and a second session is set up between the second core network device and the access network device is used for description, and a quantity of core network devices that set up sessions with the access network device is not limited. The first core network device belongs to a first PLMN of a first operator, and the second core network device belongs to a second PLMN of a second operator.

Figure 4A:
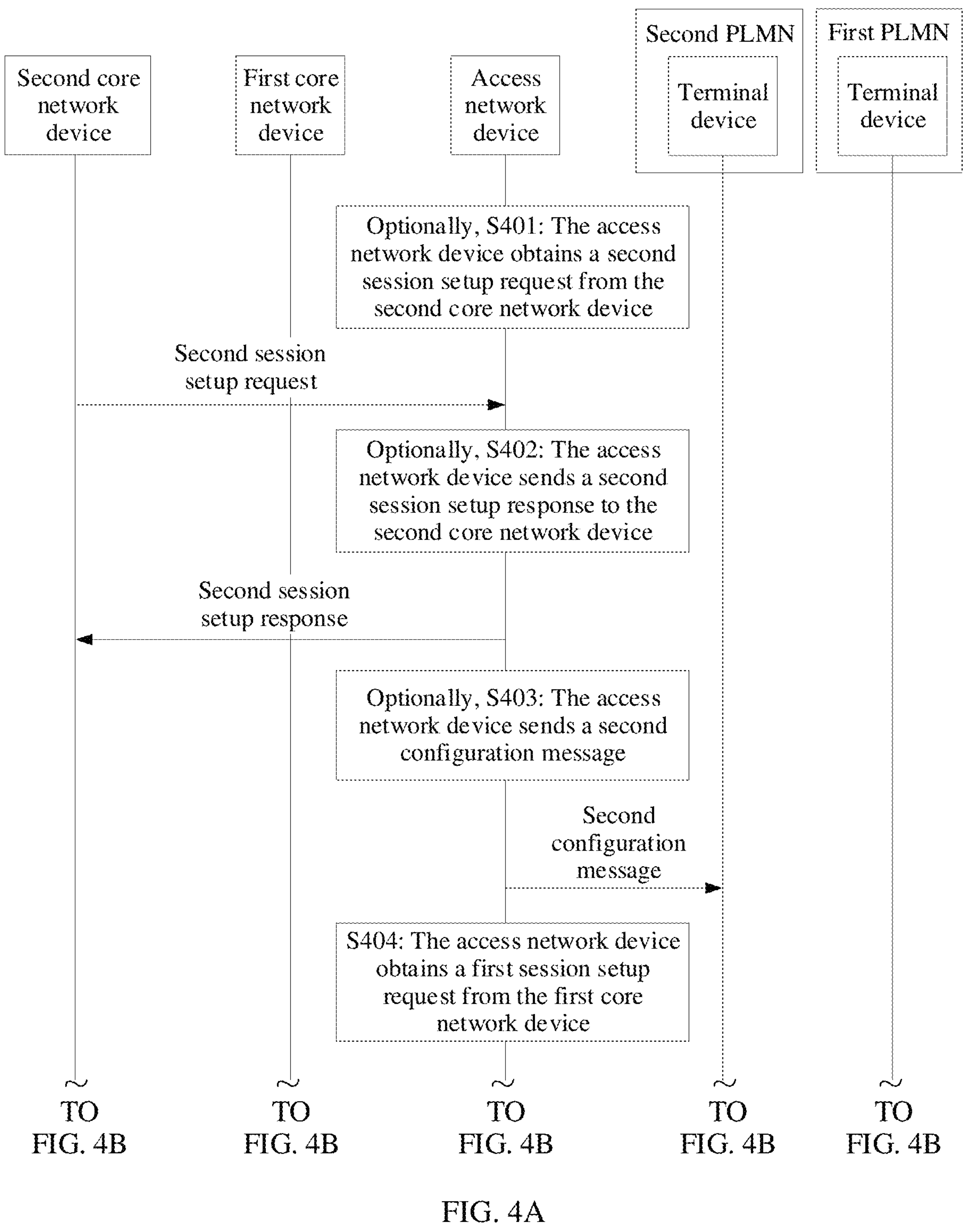
FIG. 4A and FIG. 4B are a schematic flowchart of a session setup method according to an embodiment of this application.
Figure 4B:
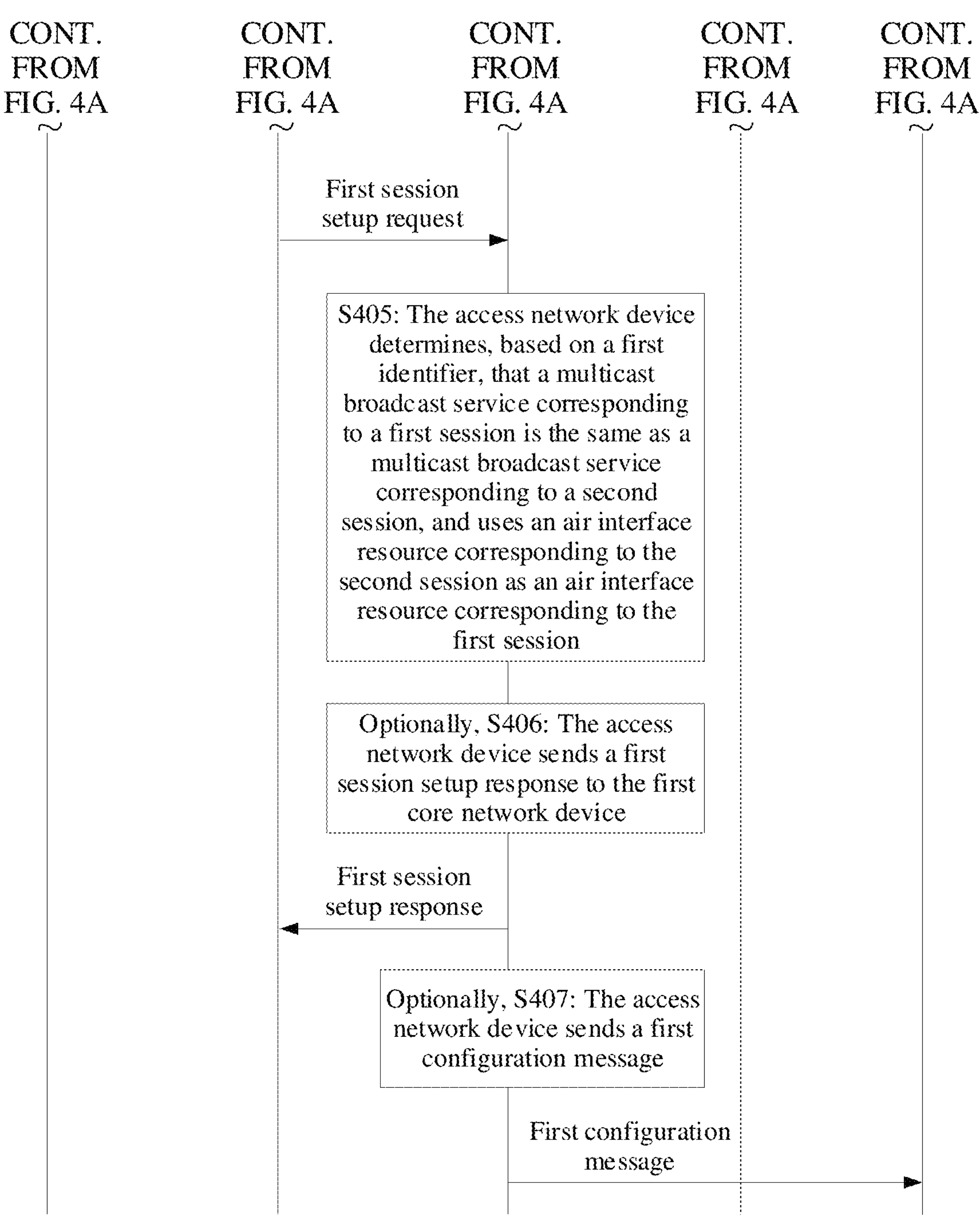

FIG. 4A and FIG. 4B are a schematic flowchart of a session setup method according to an embodiment of this application. The method includes the following steps:

In some embodiments, S401: An access network device obtains a second session setup request from a second core network device.

The second session setup request is used to request to set up a second session corresponding to a second multicast broadcast service, and the second session setup request includes a second identifier corresponding to the second multicast broadcast service. The second session setup request may further include other information, for example, a second IP multicast group address and service area (service area) information. The second IP multicast group address is address information of a data transmission channel, and the data transmission channel is used to transmit service data of the second multicast broadcast service between the access network device and the second core network device.

In this embodiment of this application, the second identifier may be implemented in a plurality of manners.

In an implementation 1, the second identifier may be a second service identifier corresponding to the second multicast broadcast service in a second PLMN in which the second core network device is located. In this case, the second identifier may be allocated by the second PLMN to the second multicast broadcast service. For example, the second PLMN is an NR network, and an SMF in the second PLMN may allocate the second identifier (that is, the second service identifier) to a first multicast broadcast service. In addition, in this implementation, the second identifier included in the second session setup request may be located in a second session identifier of the second session. Specifically, the second session identifier may be a second TMGI, and includes an identifier of the second PLMN and the second identifier (that is, the second service identifier).

In an implementation 2, the second identifier may be a second network service identifier or the second session identifier.

In this implementation, if the second network service identifier is the second TMGI, the second identifier may also be the second TMGI.

In an implementation 3, the second identifier may be a second IP multicast group address.

In an implementation 4, the second identifier may be a second public identifier allocated by a service server to the second multicast broadcast service. In PLMNs of different operators, public identifiers corresponding to a same multicast broadcast service may be the same.

If the second identifier is allocated by the service server, the second session setup request further includes the second session identifier of the second session, for example, includes the second TMGI.

The foregoing is merely an example, and the second identifier may alternatively be another identifier associated with the second multicast broadcast service. This is not limited in this embodiment of this application, and is not listed one by one herein.

In some embodiments, S402: The access network device sends a second session setup response to the second core network device.

The second session setup response may be sent when the access network device determines to set up the second session with the second core network device after receiving the second session setup request.

In this embodiment of this application, the second session setup response may include the following information:

1. The second session identifier corresponding to the second session, for example, including the second TMGI.
2. In some embodiments, downlink (downlink, DL) transmission network layer (transmission network layer, TNL) information.

If the access network device does not join an IP multicast group address corresponding to the first multicast broadcast service in the second PLMN, the access network device may further allocate a DL GTP-U address. In this case, the DL TNL information included in the second session setup response may be address information of the data transmission channel. To be specific, the DL GTP-U address is included.

In some embodiments, S403: The access network device sends a second configuration message.

The access network device may send the second configuration message to a terminal device in a second public land mobile network in which the second core network device is located. For example, in an implementation, in an LTE system, the access network device may send the second configuration message by using a single cell MBMS control channel (single cell MBMS control channel, SC-MCCH) in the second public land mobile network. In another implementation, in an NR system, the access network device may send the second configuration message by using an MBMS control channel (MBMS control channel, MCCH) in the second public land mobile network. Channel configuration information of the SC-MCCH or the MCCH may be sent by using a system message. The terminal device obtains the configuration information of the SC-MCCH or the MCCH by receiving the system message, to receive the SC-MCCH or the MCCH based on the channel configuration information of the SC-MCCH or the MCCH.

In this embodiment of this application, the second configuration message may include at least one piece of the following information:

1. The second network service identifier. The second network service identifier may identify the second multicast broadcast service. In an implementation, the second network service identifier may include the second service identifier corresponding to the second multicast broadcast service in the second PLMN. For example, the second network service identifier may be the second TMGI, and the second TMGI includes the identifier of the second PLMN and the second service identifier. The second network service identifier may alternatively be used as the second session identifier of the second session.

Service identifiers corresponding to a same multicast broadcast service in different PLMNs may be the same or may be different. This is not limited in this application. A same multicast broadcast service may correspond to one or more service identifiers in one PLMN, but one of the service identifiers is used in a session setup process.

2. A first user identifier. For example, the first user identifier may be a first group mobile subscriber identity (group radio network temporary identifier, G-RNTI), and the first user identifier may be used to scramble scheduling information of service data of the second multicast broadcast service, for example, the first user identifier may be used to scramble downlink control information (downlink control information, DCI) of scheduling service data. In a multicast broadcast technology, one user identifier may be associated with one multicast broadcast service, and a plurality of terminals that need to receive the multicast broadcast service use a same user identifier.
3. In some embodiments, configuration information of a first channel. The configuration information of the first channel may include information such as discontinuous reception (discontinuous reception, DRX) information corresponding to the first channel.
4. In some embodiments, a logical channel identifier of the first channel.
5. In some embodiments, packet data convergence protocol (packet data convergence protocol, PDCP) layer configuration information of the first channel.
6. In some embodiments, a length of a serial number (serial number, SN) of a data packet of the service data. For example, the length is 5.

The first channel is a logical channel used to transmit the service data of the second multicast broadcast service. For example, in the LTE system, when the second multicast broadcast service is an eMBMS or an MBMS, the first channel may be a single cell MBMS traffic channel (single cell MBMS traffic channel, SC-MTCH). For another example, in the NR system, when the second multicast broadcast service is a broadcast service, the first channel may be an MBMS traffic channel (MBMS traffic channel, MTCH).

The terminal device may receive the service data of the second multicast broadcast service based on the information in the second configuration message. Details are described below.

S404: The access network device obtains a first session setup request from a first core network device.

The first session setup request is used to request to set up a first session corresponding to a first multicast broadcast service, and the first session setup request includes a first identifier corresponding to the first multicast broadcast service. The first session setup request may further include other information, for example, a first IP multicast group address and a first session identifier of the first session. The first IP multicast group address is address information of a data transmission channel, and the data transmission channel is used to transmit service data of the first multicast broadcast service between the access network device and the first core network device.

In this embodiment of this application, similar to the second identifier, the first identifier may be implemented in a plurality of manners. In an implementation 1, the first identifier may be a first service identifier corresponding to the first multicast broadcast service in a first public land mobile network in which the first core network device is located, and the first service identifier may be allocated by a first PLMN in which the first core network device is located to the first multicast broadcast service. For example, the first PLMN is an NR network, and an SMF in the first PLMN may allocate the first identifier (that is, the first service identifier) to the first multicast broadcast service.

In addition, in this implementation, the first identifier included in the first session setup request may be located in a first session identifier of the first session. Specifically, the first session identifier may be a first TMGI, and includes an identifier of the first PLMN and the first identifier (that is, the first service identifier).

In an implementation 2, the first identifier may be a first network service identifier or the first session identifier of the first session.

In this implementation, if the first network service identifier is the first TMGI, the first identifier may also be the first TMGI.

In an implementation 3, the first identifier may be a first IP multicast group address.

In an implementation 4, the first identifier may be a first public identifier allocated by a service server to the first multicast broadcast service. In PLMNs of different operators, public identifiers corresponding to a same multicast broadcast service may be the same.

S405: The access network device determines, based on the first identifier, that a multicast broadcast service corresponding to the first session is the same as a multicast broadcast service corresponding to the second session, and uses an air interface resource corresponding to the second session as an air interface resource corresponding to the first session, and/or uses a data transmission channel between the access network device and the second core network device in the second session as a data transmission channel between the access network device and the first core network device in the first session.

In other words, in this embodiment of this application, if the first identifier indicates that the multicast broadcast service corresponding to the first session is the same as multicast broadcast service corresponding to the second session, the air interface resource corresponding to the first session is the same as the air interface resource corresponding to the second session, and/or the data transmission channel between the access network device and the first core network device in the first session is the same as the data transmission channel between the access network device and the second core network device in the second session. The data transmission channel between the access network device and the first core network device in the first session is used to transmit the service data of the first multicast broadcast service on a next generation (next generation, NG) interface. The data transmission channel between the access network device and the second core network device in the second session is used to transmit the service data of the first multicast broadcast service on the NG interface.

When the first session and the second session correspond to a same multicast broadcast service, the data transmission channel between the access network device and the first core network device is the same as the data transmission channel between the access network device and the second core network device, so that the service data of the first multicast broadcast service may be transmitted by using a same data transmission channel, and only one set of resources is used between different core network devices and the access network device. Therefore, resource utilization and transmission efficiency are improved.

The air interface resource may include but is not limited to a user identifier (for example, a G-RNTI), a logical channel (that is, a first channel described below) used to transmit the service data of the first multicast broadcast service, a resource used to transmit the service data of the first multicast broadcast service, and the like.

How the access network device specifically determines that the multicast broadcast service corresponding to the first session is the same as the multicast broadcast service corresponding to the second session is described below, and details are not described herein again. In addition, for details about how the access network device sends the service data of the first multicast broadcast service to the terminal device by using the air interface resource, refer to the following descriptions. Details are not described herein again.

Specifically, when the first session and the second session correspond to a same multicast broadcast service, S406 and S407 may be further included.

In some embodiments, S406: The access network device sends a first session setup response to the first core network device.

In this embodiment of this application, the first session setup response may include the following information:

1. The first session identifier corresponding to the first session, for example, including the first TMGI.
2. In some embodiments, first indication information. The first indication information indicates that the first session and the second session correspond to a same multicast broadcast service, or the first indication information may indicate that a data transmission channel for transmitting the service data of the first multicast broadcast service does not need to be established with the first core network device.

After obtaining the first indication information, the first core network device may not send the service data of the first multicast broadcast service to the access network device.

In some embodiments, the access network device no longer establishes the data transmission channel with the first core network device. In other words, in some embodiments, if the first session setup request includes the first IP multicast group address, the access network device neither joins the first IP multicast group address nor allocates address information of the data transmission channel. For example, the access network device does not allocate a DL GTP-U address to the first session. In another possible implementation, if the first session setup request does not include the first IP multicast group address, the access network device does not allocate the address information of the data transmission channel, for example, does not allocate the DL GTP-U address to the first session.

In some embodiments provided in this application, when determining that the first session that the first core network device requests to set up and the second session that is set up correspond to a same multicast broadcast service, the access network device may share, in the first session, a next generation (next generation, NG) interface resource (that is, the data transmission channel) corresponding to the second session. Therefore, resources are reduced, and resource utilization and transmission efficiency are improved.

In some embodiments, S407: The access network device sends a first configuration message.

The access network device may send the first configuration message to a terminal device in a first public land mobile network in which the first core network device is located. For example, in the LTE system, the access network device may send the first configuration message by using an SC-MCCH in the first public land mobile network. In an NR system, the access network device may send the first configuration message in the first public land mobile network by using an MCCH.

When the air interface resource corresponding to the first session is the same as the air interface resource corresponding to the second session, the first configuration message may include the following information:

1. The first network service identifier. The first network service identifier may identify the first multicast broadcast service. In an implementation, the first network service identifier may include the first service identifier corresponding to the first multicast broadcast service in the first PLMN. For example, the first network service identifier may be the first TMGI, and the first TMGI includes the identifier of the first PLMN and the first service identifier. The first network service identifier may alternatively be used as the first session identifier of the first session.
2. A first user identifier. For example, the first user identifier may be a first group mobile subscriber identity. When the first session and the second session correspond to a same multicast broadcast service, the first user identifier in the first configuration message is a first user identifier corresponding to the second session. If the first session and the second session correspond to different multicast broadcast services, the first configuration message may include a second user identifier, but does not include the first user identifier. The second user identifier may be the same as or may be different from the first user identifier. This is not limited in this application.
3. In some embodiments, configuration information of a first channel. When the first session and the second session correspond to a same multicast broadcast service, configuration information in the first configuration message is the same as configuration information in the second configuration message.

If the first session and the second session correspond to different multicast broadcast services, configuration information in the first configuration message is different from configuration information in the second configuration message.

4. In some embodiments, a logical channel identifier of the first channel. When the first session and the second session correspond to a same multicast broadcast service, a logical channel identifier in the first configuration message is the same as a logical channel identifier in the second configuration message.
5. In some embodiments, PDCP layer configuration information of the first channel. When the first session and the second session correspond to a same multicast broadcast service, PDCP layer configuration information in the first configuration message is the same as PDCP layer configuration information in the second configuration message.
6. In some embodiments, a length of an SN of a data packet of the service data. For example, the length is 5. When the first session and the second session correspond to a same multicast broadcast service, a length of an SN in the first configuration message is the same as a length of an SN in the second configuration message.
7. In some embodiments, the second network service identifier.

In some embodiments provided in this application, when determining that the first session that the first core network device requests to set up and the second session that is set up correspond to a same multicast broadcast service, the access network device may share, in the first session, the air interface resource corresponding to the second session, so that the air interface resource corresponding to the first session is the same as the air interface resource corresponding to the second session, and only one set of air interface resources is used between different core network devices and the access network device. Therefore, air interface resources are reduced, and resource utilization and transmission efficiency are improved.

In this embodiment of this application, the access network device may determine, based on the first identifier, whether the first session and the second session correspond to a same multicast broadcast service. Specifically, there may be a plurality of implementations. The following separately describes the implementations.

A first possible implementation:

In this implementation, the first identifier is the first service identifier corresponding to the first multicast broadcast service in the first PLMN, the first session identifier, the first TMGI, or the first IP multicast group address; and the second identifier is the second service identifier corresponding to the second multicast broadcast service in the second PLMN, the second session identifier, the second TMGI, or the second IP multicast group address.

In this implementation, it is agreed in advance that same identifiers are allocated to a same multicast broadcast service in different PLMNs, or a mapping relationship between the multicast broadcast service and the identifier may be established in advance. Specifically, an example in which the first identifier is the first service identifier, and the second identifier is the second service identifier is used. The following scenario 1 and scenario 2 may exist.

Scenario 1: Because service identifiers corresponding to multicast broadcast services may be different in different PLMNs, it may be agreed in advance in this embodiment of this application that same service identifiers are allocated to a same multicast broadcast service in different PLMNs, so that the access network device may uniquely determine, based on a service identifier, a multicast broadcast service corresponding to the service identifier in different PLMNs.

For example, in this embodiment of this application, the first core network device and the second core network device may identify, based on information related to the multicast broadcast service, multicast broadcast services that exist in both the first PLMN and the second PLMN, to set service identifiers of multicast broadcast services that exist in a plurality of PLMNs to same identifiers. The information related to the multicast broadcast service may include but is not limited to information provided by the service server, port information of the multicast broadcast service, and the like.

In some embodiments, an identifier allocation range may be preconfigured. The identifier allocation range includes a plurality of identifiers. The service identifier of the multicast broadcast services that exist in the plurality of PLMNs may be one identifier selected from the identifier allocation range. For example, the identifier allocation range may be from 000010 to 0000FF.

For example, the service identifiers of the multicast broadcast services that exist in the plurality of PLMNs may be shown in Table 1.

TABLE 1

| | Service identifier | Existing PLMN |
|---|---|---|
| Multicast broadcast service 1 | Identifier 1 | Existing in the first PLMN and the second PLMN |
| Multicast broadcast service 2 | Identifier 2 | Existing in the first PLMN and the second PLMN |
| Multicast broadcast service 3 | Identifier 3 | Existing in the first PLMN |

In Table 1, the multicast broadcast service 1 exists in the first PLMN and the second PLMN. In this case, service identifiers of the multicast broadcast service 1 in the first PLMN and the second PLMN are both the identifier 1. Other cases are deduced by analogy, and details are not described again.

The first core network device may send mapping relationships between the service identifiers of the multicast broadcast services that exist in the plurality of PLMNs and the multicast broadcast services to an access network device in the first PLMN. Similarly, the second core network device may send mapping relationships between the service identifiers of the multicast broadcast services that exist in the plurality of PLMNs and the multicast broadcast services to an access network device in the second PLMN.

In a scenario 1, similar to the case in which the first identifier is the first service identifier, when the first identifier is the first session identifier or the first TMGI, it is agreed in advance that same service identifiers are allocated to a same multicast broadcast service in different PLMNs. When the first identifier is the first IP multicast group address, it may be agreed in advance that same IP multicast group addresses are allocated to a same multicast broadcast service in different PLMNs.

Figure 5:
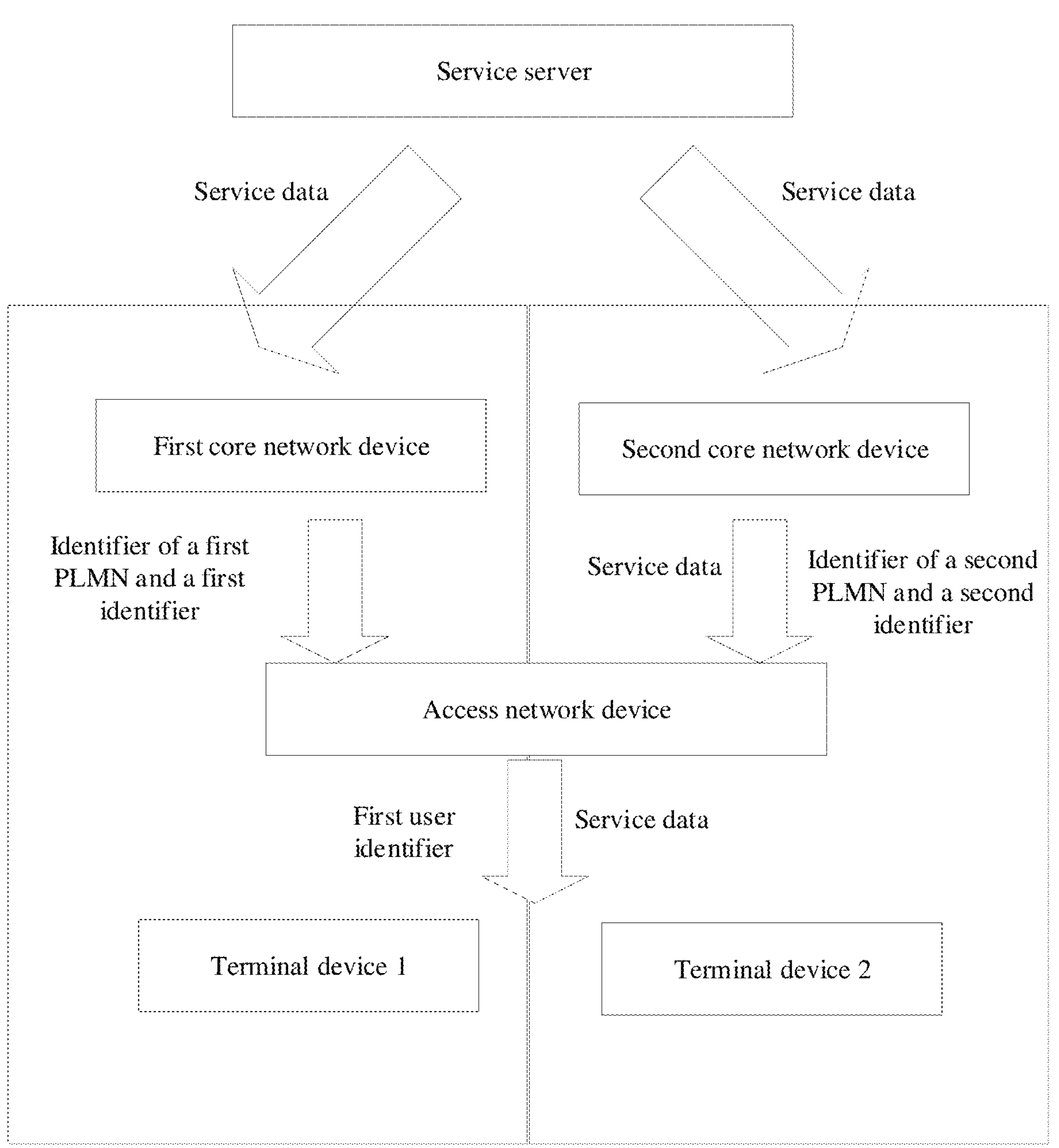
FIG. 5 is a schematic flowchart of session setup according to an embodiment of this application.

In scenario 1, FIG. 5 is a schematic flowchart of session setup according to an embodiment of this application. In FIG. 5, in a process of setting up the first session, information sent by the first core network device to the access network device includes the identifier of the first PLMN and the first identifier. In a process of setting up the second session, information sent by the second core network device to the access network device includes the identifier of the second PLMN and the second identifier. If the first identifier matches the second identifier, the access network device may determine that the second session and the first session correspond to a same multicast broadcast service. To be specific, the first multicast broadcast service corresponding to the first identifier is the same as the second multicast broadcast service corresponding to the second identifier. If the first identifier does not match the second identifier, the access network device may determine that the second session and the first session correspond to different multicast broadcast services. To be specific, the first multicast broadcast service corresponding to the first identifier is different from the second multicast broadcast service corresponding to the second identifier.

For example, when the first identifier is the first service identifier, and the second identifier is the second service identifier, if the first identifier is the same as the second identifier, it may be determined that the first identifier matches the second identifier. If the first identifier is different from the second identifier, it may be determined that the first identifier does not match the second identifier.

For example, when the first identifier is the first session identifier or the first TMGI, and the second identifier is the second session identifier or the second TMGI, if the first service identifier in the first identifier is the same as the second service identifier in the second identifier, it may be determined that the first identifier matches the second identifier. If the first service identifier in the first identifier is different from the second service identifier in the second identifier, it may be determined that the first identifier does not match the second identifier.

For example, when the first identifier is the first IP multicast group address, and the second identifier is the second IP multicast group address, if the first identifier is the same as the second identifier, it may be determined that the first identifier matches the second identifier. If the first identifier is different from the second identifier, it may be determined that the first identifier does not match the second identifier.

In some embodiments, when obtaining the first identifier, the access network device may first determine whether the first identifier exists within the identifier allocation range. If it is determined that the first identifier is within the identifier allocation range, then whether the first identifier matches the second identifier is determined. If it is determined that the first identifier is not within the identifier allocation range, the access network device may consider that a session is not set up in any PLMN for the first multicast broadcast service corresponding to the first identifier. According to this method, session setup efficiency may be improved.

Scenario 2: The access network device may pre-establish a first mapping relationship, where the first mapping relationship includes a mapping relationship between a multicast broadcast service and an identifier in PLMNs of different operators. Alternatively, the first core network device or the second core network device may establish a first mapping relationship, and then send the first mapping relationship to the access network device.

An example in which the first mapping relationship is a mapping relationship between a multicast broadcast service and a service identifier is used. When the access network device establishes the first mapping relationship, the access network device may identify a service identifier of each multicast broadcast service in different PLMNs based on information related to the multicast broadcast service, so that service identifiers of multicast broadcast services in different PLMNs may be stored, to obtain the first mapping relationship.

For example, the service identifiers of the multicast broadcast services that exist in the plurality of PLMNs may be shown in Table 2. In Table 2, one multicast broadcast service may have a plurality of service identifiers in one PLMN.

TABLE 2

| | Service identifier in PLMN 1 | Service identifier in PLMN 2 | Service identifier in PLMN 3 |
|---|---|---|---|
| Multicast broadcast service 1 | Identifier 1-1 and identifier 1-2 | Identifier 1-3 | Identifier 1-4 |
| Multicast broadcast service 2 | Identifier 2-1 and identifier 2-2 | None | Identifier 2-3 |
| Multicast broadcast service 3 | Identifier 3-1 | None | None |

In Table 2, the multicast broadcast service 1 exists in the PLMN 1 to the PLMN 3, and corresponding service identifiers are separately shown in Table 2. The multicast broadcast service 2 exists in the PLMN 1 and the PLMN 3, and does not exist in the PLMN 2. Corresponding service identifiers are separately shown in Table 2. Other cases are deduced by analogy, and details are not described again.

In scenario 2, when the first mapping relationship is a mapping relationship between a multicast broadcast service and a session identifier, similar to the foregoing description, a session identifier of each multicast broadcast service in different PLMNs may be identified based on information related to the multicast broadcast service, so that session identifiers of multicast broadcast services in different PLMNs may be stored, to obtain the first mapping relationship.

When the first mapping relationship is a mapping relationship between a multicast broadcast service and a TMGI, a TMGI of each multicast broadcast service in different PLMNs may be identified based on information related to the multicast broadcast service, so that TMGIs of multicast broadcast services in different PLMNs may be stored, to obtain the first mapping relationship.

When the first mapping relationship is a mapping relationship between a multicast broadcast service and an IP multicast group address, IP multicast group addresses of each multicast broadcast service in different PLMNs may be identified based on information related to the multicast broadcast service, so that IP multicast group addresses of multicast broadcast services in different PLMNs may be stored, to obtain the first mapping relationship.

In scenario 2, as shown in FIG. 5, information sent by the first core network device to the access network device in a process of setting up the first session includes the identifier of the first PLMN and the first identifier, and information sent by the second core network device to the access network device in a process of setting up the second session includes the identifier of the second PLMN and the second identifier.

If the first identifier matches the second identifier, the access network device may determine that the second session and the first session correspond to a same multicast broadcast service. Specifically, the access network device may determine, based on the first mapping relationship, the first multicast broadcast service corresponding to the first identifier, and determine, based on the first mapping relationship, the second multicast broadcast service corresponding to the second identifier. If the first multicast broadcast service and the second multicast broadcast service are the same, it may be determined that the first identifier matches the second identifier, so that it may be determined that the second session and the first session correspond to a same multicast broadcast service. If the first multicast broadcast service and the second multicast broadcast service are different, it may be determined that the first identifier does not match the second identifier, so that it may be determined that the second session and the first session correspond to different multicast broadcast services.

For example, with reference to Table 2, the first identifier obtained by the access network device from the first core network device in the PLMN 1 is the identifier 1-1, and the second identifier obtained from the first core network device in the PLMN 2 is the identifier 1-3. The access network device may determine, based on the first mapping relationship shown in Table 2, that the first identifier corresponds to the multicast broadcast service 1 in the PLMN 1, and that the second identifier also corresponds to the multicast broadcast service 1 in the PLMN 2, so that it may be determined that the second session and the first session correspond to a same multicast broadcast service. To be specific, it may be determined that the first identifier matches the second identifier.

For another example, with reference to Table 2, the first identifier obtained by the access network device from the first core network device in the PLMN 1 is the identifier 2-1, and the second identifier obtained from the first core network device in the PLMN 2 is the identifier 1-3. The access network device may determine, based on the first mapping relationship shown in Table 2, that the first identifier corresponds to the multicast broadcast service 2 in the PLMN 1, and determine that the second identifier corresponds to the multicast broadcast service 1 in the PLMN 2, so that it may be determined that the second session and the first session correspond to different multicast broadcast services. To be specific, it may be determined that the first identifier does not match the second identifier.

In some embodiments, when obtaining the first identifier, the access network device may first determine whether the first mapping relationship includes the first identifier. If it is determined that the first identifier is in the first mapping relationship, then whether the first identifier matches the second identifier is determined based on the first mapping relationship.

If it is determined that the first identifier is not in the first mapping relationship, the access network device may consider that a session is not set up in any PLMN for the first multicast broadcast service corresponding to the first identifier. According to this method, session setup efficiency may be improved.

A Second Possible Implementation:

In this implementation, the first identifier may be a first public identifier allocated by a service server, and the second identifier may be a second public identifier allocated by the service server. For ease of description, in the second possible implementation, the first identifier is referred to as the first public identifier, and the second identifier is referred to as the second public identifier.

In this embodiment of this application, a public identifier may exist independently. In other words, the public identifier may be carried in an independent field. Alternatively, the public identifier may be located in the TMGI or the service identifier. To be specific, the public identifier may be a part of the TMGI or the service identifier. For example, when the public identifier is a part of the TMGI, the TGMI may include a PLMN identifier, the service identifier, and the public identifier.

Figure 6:
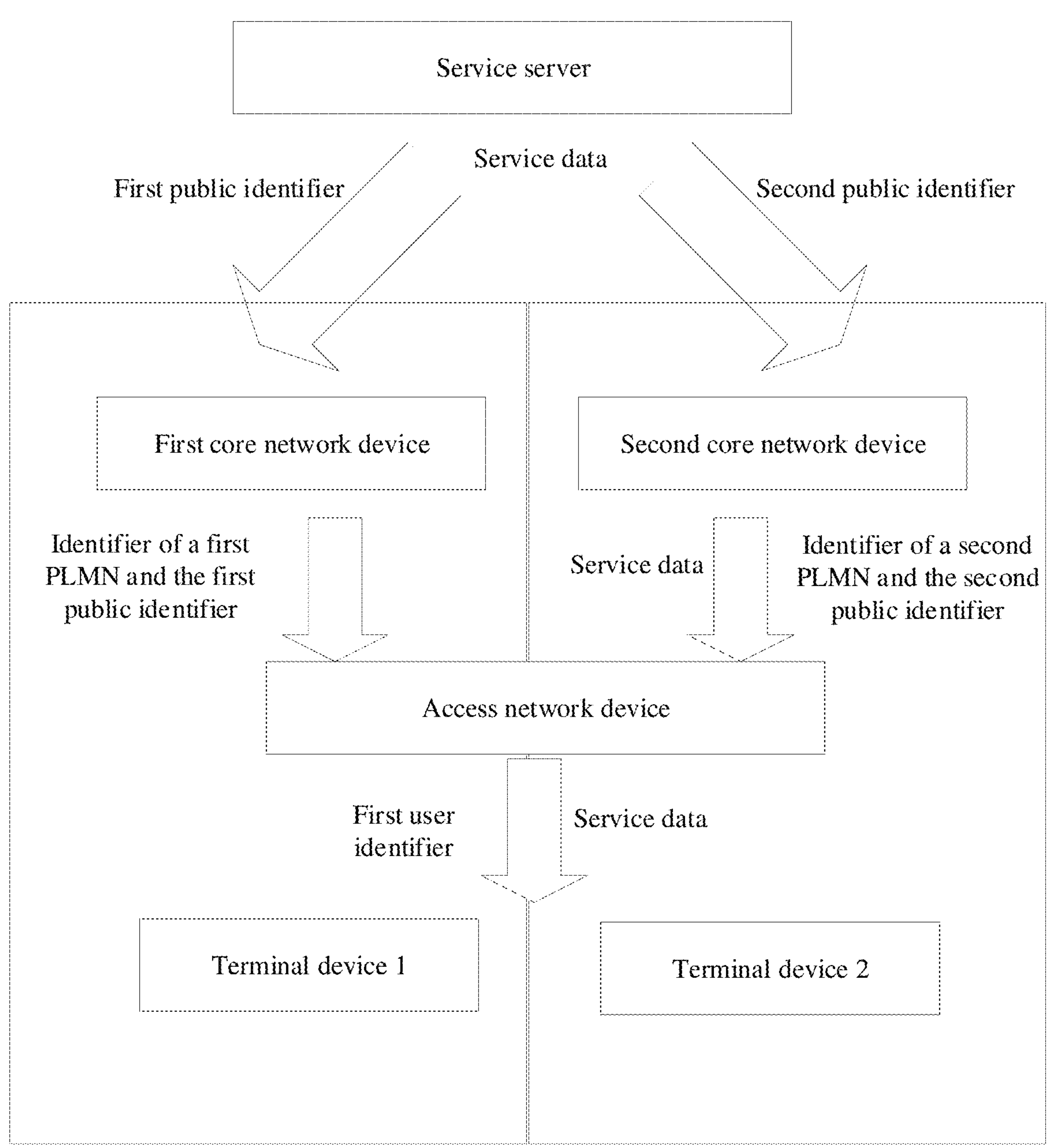
FIG. 6 is a schematic flowchart of session setup according to an embodiment of this application.

In the second possible implementation, FIG. 6 is a schematic flowchart of session setup according to an embodiment of this application. In FIG. 6, in a process of setting up the first session, information sent by the first core network device to the access network device includes the identifier of the first PLMN, the first TMGI, and the first public identifier. In a process of setting up the second session, information sent by the second core network device to the access network device includes the identifier of the second PLMN, the second TMGI, and the second public identifier. Both the first public identifier and the second public identifier are allocated by the service server. Herein, an example in which the public identifier and the TMGI are mutually independent identifiers and are carried by using different fields in a message is used for description.

If the first identifier matches the second identifier, the access network device may determine that the second session and the first session correspond to a same multicast broadcast service. Specifically, if the access network device determines that the first public identifier is the same as a second public identifier, it may be determined that the first identifier matches the second identifier. To be specific, it may be determined that the second session and the first session correspond to a same multicast broadcast service. If the access network device determines that the first public identifier is different from the second public identifier, it may be determined that the first identifier does not match the second identifier. To be specific, it may be determined that the second session and the first session correspond to different multicast broadcast services.

When the first session and the second session correspond to a same multicast broadcast service, an air interface resource indicated by the access network device to a first terminal device in the first PLMN, for example, a first G-RNTI, is the same as an air interface resource indicated by the access network device to a second terminal device in the second PLMN.

In this embodiment of this application, when the first session and the second session correspond to a same multicast broadcast service, the access network device may receive, from the second core network device in the second PLMN, service data corresponding to the first multicast broadcast service. The first core network device no longer sends the service data corresponding to the first multicast broadcast service to the access network device. The access network device transmits the service data corresponding to the first multicast broadcast service to a terminal device in the first PLMN and a terminal device in the second PLMN by using an air interface resource corresponding to the second session.

Before the access network device transmits the service data corresponding to the first multicast broadcast service, in the first PLMN and the second PLMN, the access network device may send scheduling information scrambled by a first user identifier. The scheduling information may be used to schedule the service data corresponding to the first multicast broadcast service. For example, the scheduling information may be downlink control information (downlink control information, DCI).

The terminal device in the first PLMN and the terminal device in the second PLMN may receive, by using a same air interface resource, the service data corresponding to the first multicast broadcast service. Specifically, the terminal device in the first PLMN and the terminal device in the second PLMN may receive, on a same logical channel (for example, a first channel) by using a same user identifier (for example, the first user identifier), the service data corresponding to the first multicast broadcast service. The terminal device in the first PLMN is used as an example, and a process of receiving data by the terminal device may be as follows:

The terminal device receives a system message, and obtains channel configuration information of an SC-MCCH or an MCCH by using the system message. The channel configuration information may indicate information such as a repetition period (repetition period, RP) and offset (offset) of the SC-MCCH or the MCCH.

The terminal device determines a location of the SC-MCCH or the MCCH based on the channel configuration information. The terminal device obtains, in advance, a first network service identifier corresponding to the first multicast broadcast service that needs to be received, and the first network service identifier may be used as the first session identifier.

When the terminal device receives a first configuration message in the SC-MCCH or the MCCH, the first configuration message includes the first network service identifier and the first user identifier, and in some embodiments, further includes configuration information of the first channel. The first channel herein may be an SC-MTCH or an MTCH. When determining that the first configuration message includes the first network service identifier, the terminal device determines that the service data may be received by using the first user identifier in the first configuration message.

For example, the first user identifier included in the first configuration message is the first G-RNTI. The terminal device may receive, in a physical downlink control channel (physical downlink control channel, PDCCH), scheduling information scrambled by using the first G-RNTI, and receive, on the first channel, data scheduled by the scheduling information. The data scheduled by the scheduling information is the service data corresponding to the first multicast broadcast service.

If the first configuration message does not include the configuration information of the first channel, after receiving the configuration message, the terminal device may always detect, in the PDCCH, whether the scheduling information scrambled by using the first G-RNTI exists. If the first configuration message includes the configuration information of the first channel, the terminal device may detect, only in a DRX active slot indicated by the configuration information, whether the scheduling information scrambled by using the first G-RNTI exists.

Further, in some embodiments, in this embodiment of this application, before S404, if the first core network device determines that the second core network device sets up a session corresponding to the first multicast broadcast service with the access network device, the first core network device carries the following information in a first session setup request:

1. The identifier of the second PLMN or the second session identifier of the second session.
2. The first session identifier of the first session.
3. In some embodiments, the identifier of the first PLMN.
4. In some embodiments, the first IP multicast group address.

In this case, when obtaining the identifier of the second PLMN from the first session setup request, the access network device may no longer configure an air interface resource for the first session, to be specific, the air interface resource corresponding to the first session is the same as the air interface resource corresponding to the second session; and/or the access network device no longer establishes, with the first core network device, a data transmission channel used to transmit the service data of the first multicast broadcast service, to be specific, a data transmission channel between the access network device and the first core network device in the first session is the same as a data transmission channel between the access network device and the second core network device in the second session.

In addition, the access network device may indicate, to the terminal device in the first PLMN, that a multicast broadcast service corresponding to the first identifier is the same as a multicast broadcast service corresponding to the second identifier, and the terminal device in the first PLMN may receive the service data of the first multicast broadcast service by using the second identifier and the first user identifier. In this case, in S407, the first configuration message sent by the access network device to the terminal device in the first PLMN may include the following information:

the identifier of the second PLMN or the second session identifier of the second session; the first session identifier of the first session; the first user identifier; and in some embodiments, the configuration information of the first channel.

Alternatively, the identifier of the second PLMN or the second session identifier may not be carried in the first configuration message, but may be carried in another message. This is not limited in this embodiment of this application.

When the terminal device receives the first configuration message, if the first configuration message includes the second session identifier and the first session identifier, it may be determined that the first session and the second session correspond to a same multicast broadcast service, and the terminal device may receive, based on the first user identifier, the service data corresponding to the first multicast broadcast service.

Similarly, if the first configuration message includes the identifier of the second PLMN and the first session identifier, the terminal device may determine that a multicast broadcast service that is the same as the first multicast broadcast service exists in the second PLMN. Service data of the multicast broadcast service is scheduled by using the scheduling information scrambled by using the first user identifier, and the terminal device may receive, based on the first user identifier, the service data corresponding to the first multicast broadcast service.

In this embodiment of this application, if the second core network device stops transmitting the service data of the first multicast broadcast service, the access network device may trigger re-setup of the first session in the second PLMN. Specifically, the following processes may be included:

The access network device sends a first message to the first core network device. The first message indicates to set up the first session.

The first message may include a size of a data packet of sent multicast service data, and/or the first message includes an end marker (end marker) of a last data packet of sent multicast service data. The end marker may be a GTP-U serial number (serial number, SN).

The access network device receives a second message from the first core network device. The second message is used to request to re-set up the first session, and the second message may include an IP multicast group address. For example, the second message may be a session setup request message.

In some embodiments, a data transmission channel is established between the access network device and the first core network device. Specifically, the access network device may establish the data transmission channel by joining the IP multicast group address or allocating a GTP-U address.

Finally, the access network device sends a third message to the first core network device. The third message is used to respond to the second message. For example, the third message may be a session setup response message.

The third message may include the first session identifier of the first session. In some embodiments, the third message may further include the GTP-U address.

The access network device further needs to send a third configuration message to the terminal device in the first PLMN. The third configuration message may include the following information: the first session identifier of the first session; a second user identifier, where the second user identifier may be the same as or different from the first user identifier; and in some embodiments, configuration information of a second channel. The second channel is a logical channel that is in the first PLMN and that is used to transmit the service data of the first multicast broadcast service. The second user identifier may be used to scramble the scheduling information of the service data of the first multicast broadcast service.

After receiving the third configuration message, the terminal device may receive the service data of the first multicast broadcast service based on the second user identifier. A specific process is not described in detail again.

To implement functions in the foregoing method provided in embodiments of this application, the access network device, the terminal device, or the communication apparatus may include a hardware structure and/or a software module, and implement the foregoing functions by using the hardware structure, the software module, or a combination of the hardware structure and the software module. Whether a function in the foregoing functions is executed in a form of the hardware structure, the software module, or both the hardware structure and the software module depends on specific application and design constraint conditions of the technical solutions.

Module division in embodiments of this application is an example, is merely logical function division, and may be other division during actual implementation. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 7:
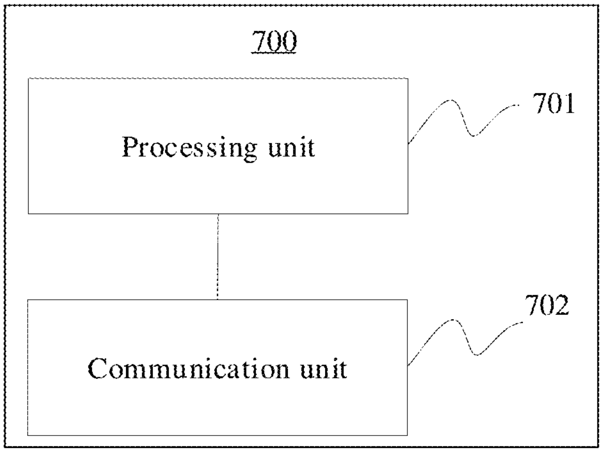
FIG. 7 is a schematic diagram of a structure of a communication apparatus according to an embodiment of this application.

Same as the foregoing concept, as shown in FIG. 7, an embodiment of this application further provides a communication apparatus. The communication apparatus 700 may be the terminal device in FIG. 1, and is configured to implement the method for the terminal device in the foregoing method embodiment. Alternatively, the communication apparatus may be the access network device in FIG. 1, and is configured to implement the method corresponding to the access network device in the foregoing method embodiment. For a specific function, refer to the description in the foregoing method embodiment.

Specifically, the communication apparatus 700 may include: a processing unit 701 and a communication unit 702. In this embodiment of this application, the communication unit may also be referred to as a transceiver unit, and may include a sending unit and/or a receiving unit, which are respectively configured to perform sending and receiving steps of the network device or the terminal device in the foregoing method embodiments. The following describes in detail communication apparatuses provided in embodiments of this application with reference to FIG. 7 and FIG. 8.

In some possible implementations, behavior and functions of the access network device in the foregoing method embodiment may be implemented by using the communication apparatus 700, for example, the method performed by the access network device in the embodiment in FIG. 4A and FIG. 4B. For example, the communication apparatus 700 may be an access network device, a component (for example, a chip or a circuit) used in the access network device, a chip or a chip set in the access network device, or a part that is of a chip and that is configured to perform a related method function. The communication unit 702 may be configured to perform a receiving or sending operation performed by the access network device in the embodiment shown in FIG. 4A and FIG. 4B. The processing unit 701 may be configured to perform an operation other than a receiving or sending operation performed by the access network device in the embodiment shown in FIG. 4A and FIG. 4B.

The communication unit is configured to obtain a first session setup request from a first core network device. The first session setup request is used to request to set up a first session corresponding to a first multicast broadcast service, and the first session setup request includes a first identifier corresponding to the first multicast broadcast service.

The processing unit is configured to: determine, based on the first identifier, that a multicast broadcast service corresponding to the first session is the same as a multicast broadcast service corresponding to a second session, and use an air interface resource corresponding to the second session as an air interface resource corresponding to the first session. To be specific, the air interface resource corresponding to the first session is the same as an air interface resource corresponding to the second session. The second session is a session set up with a second core network device.

In some embodiments, a data transmission channel with the first core network device in the first session is the same as a data transmission channel with the second core network device in the second session.

In some embodiments, the communication unit is further configured to:

- send a second configuration message in a second public land mobile network in which the second core network device is located, where the second configuration message includes a first user identifier, and the first user identifier is used to scramble scheduling information of service data of the first multicast broadcast service.

In some embodiments, the communication unit is further configured to send a first configuration message in a first public land mobile network in which the first core network device is located, where the first configuration message includes the first user identifier.

In some embodiments, the first configuration message and the second configuration message further include configuration information of a first channel. The first channel is used to transmit the service data of the first multicast broadcast service, and the first channel is configured in a process of setting up the second session.

In some embodiments, the communication unit is further configured to:

- send a first session setup response to the first core network device, where the first session setup response includes first indication information, and the first indication information indicates that the multicast broadcast service corresponding to the first session is the same as the multicast broadcast service corresponding to the second session.

In some embodiments, the first identifier is a first service identifier corresponding to the first multicast broadcast service in the first public land mobile network in which the first core network device is located, a first network service identifier, or a first IP multicast group address.

In some embodiments, the processing unit is specifically configured to: if the first identifier matches a second identifier, determine that the second session and the first session correspond to a same multicast broadcast service, where the second identifier is from a second session setup request, and the second session setup request is used to request to set up the second session.

In some embodiments, before the determining, based on the first identifier, that a multicast broadcast service corresponding to the first session is the same as a multicast broadcast service corresponding to a second session, the processing unit is further configured to: determine that the first identifier is within an identifier allocation range, where the identifier allocation range is preconfigured.

In some embodiments, the processing unit is specifically configured to:

if it is determined, based on a first mapping relationship, that the first multicast broadcast service corresponding to the first identifier is the same as a second multicast broadcast service corresponding to a second identifier, determine that the first session and the second session correspond to a same multicast broadcast service, where the first mapping relationship includes a mapping relationship between a multicast broadcast service and an identifier in public land mobile networks of different operators, the second identifier is from a second session setup request, and the second session setup request is used to request to set up the second session.

In some embodiments, the first mapping relationship is from the first core network device or the second core network device; or the first mapping relationship is determined by an access network device based on the relationship between the multicast broadcast service and the identifier in the public land mobile networks of different operators.

In some embodiments, before the determining, based on the first identifier, that a multicast broadcast service corresponding to the first session is the same as a multicast broadcast service corresponding to a second session, the processing unit is further configured to determine that the first mapping relationship includes the first identifier.

In some embodiments, the first identifier is a first public identifier allocated by a service server to the first multicast broadcast service.

In some embodiments, the processing unit is specifically configured to:

if it is determined that the first public identifier is the same as a second public identifier, determine that the first session and the second session correspond to a same multicast broadcast service, where the second public identifier is from a second session setup request, and the second session setup request is used to request to set up the second session.

In some embodiments, the communication unit is further configured to:

if it is determined that the second core network device stops transmitting the service data of the first multicast broadcast service, send a first message to the first core network device, where the first message indicates to set up the first session;

receive a second message from the first core network device, where the second message is used to request to re-establish the first session; and send a third message to the first core network device, where the third message is used to respond to the second message.

In some embodiments, the first message includes a size of a data packet of sent multicast service data; and/or the first message includes an end marker of a last data packet of sent multicast service data.

In some possible implementations, behavior and functions of the access network device in the foregoing method embodiment may be implemented by using the communication apparatus 700, for example, the method performed by the core network device in the embodiment in FIG. 3. For example, the communication apparatus 700 may be a core network device, a component (for example, a chip or a circuit) used in the core network device, a chip or a chip set in the core network device, or a part that is of a chip and that is configured to perform a related method function. The communication unit 702 may be configured to perform a receiving or sending operation performed by the core network device in the embodiment shown in FIG. 3. The processing unit 701 may be configured to perform an operation other than a receiving or sending operation performed by the core network device in the embodiment shown in FIG. 3.

The communication unit is configured to: send a first session setup request to an access network device, where the first session setup request is used to request to set up a first session corresponding to a first multicast broadcast service, and the first session setup request includes a first identifier corresponding to the first multicast broadcast service; and receive a first session setup response from the access network device, where the first session setup response includes first indication information, and the first indication information indicates that a multicast broadcast service corresponding to the first session is the same as a multicast broadcast service corresponding to a second session. The first core network device determines not to send service data of the first multicast broadcast service to the access network device.

In some embodiments, a data transmission channel between the access network device and the first core network device in the first session is the same as a data transmission channel between the access network device and the second core network device in the second session.

In some embodiments, the communication unit is further configured to: receive a first message from the access network device, where the first message indicates to set up the first session; and send a second message to the access network device, where the second message is used to request to re-set up the first session.

In some embodiments, the communication unit is further configured to receive a third message from the access network device, where the third message is used to respond to the second message.

In some embodiments, the first message includes a size of a data packet of sent multicast service data; and/or the first message includes an end marker of a last data packet of sent multicast service data.

In some embodiments, the first identifier is a first service identifier corresponding to the first multicast broadcast service in the first public land mobile network in which the first core network device is located, a first network service identifier, or a first IP multicast group address.

In some embodiments, the first identifier is a first public identifier allocated by a service server to the first multicast broadcast service.

It should be understood that descriptions of apparatus embodiments correspond to the descriptions of the method embodiments. For an apparatus structure used to implement the terminal device and the access network device in FIG. 4A and FIG. 4B, refer to the communication apparatus 700. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. In some embodiments, a component that is in the communication unit 702 and that is configured to implement a receiving function may be considered as a receiving unit, and a component that is in the communication unit 702 and that is configured to implement a sending function may be considered as a sending unit. To be specific, the communication unit 702 includes the receiving unit and the sending unit. The communication unit sometimes may also be referred to as a transceiver machine, a transceiver, a transceiver circuit, or the like. The receiving unit may also be sometimes referred to as a receiver machine, a receiver, a receiver circuit, or the like. The sending unit sometimes may also be referred to as a transmitter machine, a transmitter, a transmitter circuit, or the like.

The foregoing is merely an example. The processing unit 701 and the communication unit 702 may further perform other functions. For more detailed descriptions, refer to the related descriptions in the method embodiment shown in FIG. 4A and FIG. 4B. Details are not described herein again.

Figure 8:
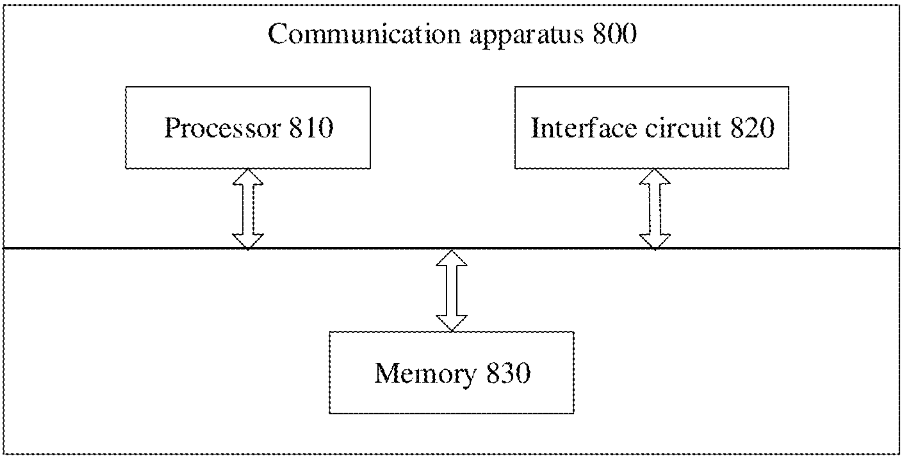
FIG. 8 is a schematic diagram of a structure of a communication apparatus according to an embodiment of this application.

FIG. 8 shows a communication apparatus according to an embodiment of this application. The communication apparatus shown in FIG. 8 may be an implementation of a hardware circuit of the communication apparatus shown in FIG. 7. The communication apparatus is applicable to the foregoing flowchart, and performs the function of the terminal device or the network device in the foregoing method embodiments. For ease of description, FIG. 8 merely shows main components of the communication apparatus.

As shown in FIG. 8, the communication apparatus 800 includes a processor 810 and an interface circuit 820. The processor 810 and the interface circuit 820 are coupled to each other. It may be understood that the interface circuit 820 may be a transceiver or an input/output interface. In some embodiments, the communication apparatus 800 may further include a memory 830 configured to store instructions executed by the processor 810, input data required by the processor 810 to run instructions, or data generated after the processor 810 runs instructions.

When the communication apparatus 800 is configured to implement the methods shown in FIG. 3 to FIG. 7, the processor 810 is configured to perform the functions of the processing unit 701, and the interface circuit 820 is configured to perform the functions of the communication unit 702.

When the communication apparatus is a chip used in a terminal device, the chip in the terminal device implements a function of a terminal device in the foregoing method embodiment. The chip in the terminal device receives information from another module (for example, a radio frequency module or an antenna) in the terminal device, and the information is sent by an access network device to the terminal device. Alternatively, the chip in the terminal device sends information to another module (for example, a radio frequency module or an antenna) in the terminal device, and the information is sent by the terminal device to an access network device.

When the communication apparatus is a chip used in an access network device, the chip in the access network device implements functions of a network device in the foregoing method embodiments. The chip in the access network device receives information from another module (for example, a radio frequency module or an antenna) in the access network device, and the information is sent by a terminal device to a network device. Alternatively, the chip in the access network device sends information to another module (for example, a radio frequency module or an antenna) in the access network device, and the information is sent by the access network device to a terminal device.

It may be understood that the processor in embodiments of this application may be a central processing unit (Central Processing Unit, CPU), or another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device or a transistor logic device. The general-purpose processor may be a microprocessor, any processor, or the like.

In embodiments of this application, the memory may be a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, or any other form of storage medium well known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. The processor and the storage medium may alternatively exist in a network device or a terminal device as discrete components.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clearly that, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A method, comprising:

obtaining a first session setup request from a first core network device, wherein the first session setup request is usable to request to set up a first session corresponding to a first multicast broadcast service, and the first session setup request comprises a first identifier corresponding to the first multicast broadcast service;

determining, based on the first identifier, that a multicast broadcast service corresponding to the first session is the same as a multicast broadcast service corresponding to a second session, and using an air interface resource corresponding to the second session as an air interface resource corresponding to the first session, wherein the second session is a session set up of a second core network device; and sending a second configuration message for a second public land mobile network, the second core network device being located in the second public land mobile network, wherein the second configuration message comprises a first user identifier, and the first user identifier is usable to scramble scheduling information of service data of the first multicast broadcast service.

2. The method according to claim 1, wherein a data transmission channel of the first core network device in the first session is the same as a data transmission channel of the second core network device in the second session.

3. The method according to claim 1, wherein the first identifier is a first service identifier corresponding to the first multicast broadcast service in a first public land mobile network, a first network service identifier, or a first internet protocol (IP) multicast group address, the first core network device being located in the first public land mobile network.

4. The method according to claim 1, wherein the first identifier is a first public identifier allocated by a service server to the first multicast broadcast service.

5. The method according to claim 1, further comprising:

sending a first message to the first core network device in response to determining that the second core network device stops transmitting service data of the first multicast broadcast service, wherein the first message is useable to indicate setting up the first session.

6. The method according to claim 1, further comprising:

sending a first configuration message for a first public land mobile network, the first core network device being located in the first public land mobile network, wherein the first configuration message comprises the first user identifier.

7. A method, comprising:

sending a first session setup request to an access network device, wherein the first session setup request is usable to request to set up a first session corresponding to a first multicast broadcast service, and the first session setup request comprises a first identifier corresponding to the first multicast broadcast service;

receiving a first session setup response from the access network device, wherein the first session setup response comprises first indication information, and the first indication information is usable to indicate that a multicast broadcast service corresponding to the first session is the same as a multicast broadcast service corresponding to a second session; and determining not to send service data of the first multicast broadcast service to the access network device.

8. The method according to claim 7, wherein a data transmission channel between the access network device and a first core network device in the first session is the same as a data transmission channel between the access network device and a second core network device in the second session.

9. The method according to claim 7, wherein the method further comprises:

receiving a first message from the access network device, wherein the first message is usable to indicate to set up the first session.

10. The method according to claim 7, wherein the first identifier is a first service identifier corresponding to the first multicast broadcast service in a first public land mobile network, a first network service identifier, or a first internet protocol (IP) multicast group address, a first core network device being located in the first public land mobile network.

11. The method according to claim 7, wherein the first identifier is a first public identifier allocated by a service server to the first multicast broadcast service.

12. An apparatus, comprising:

one or more processors and a memory, wherein the memory is configured to store non-transitory instructions, and the one or more processors are configured to execute the non-transitory instructions to thereby cause the apparatus to:

obtain a first session setup request from a first core network device, wherein the first session setup request is usable to request to set up a first session corresponding to a first multicast broadcast service, and the first session setup request comprises a first identifier corresponding to the first multicast broadcast service;

determine, based on the first identifier, that a multicast broadcast service corresponding to the first session is the same as a multicast broadcast service corresponding to a second session, and using an air interface resource corresponding to the second session as an air interface resource corresponding to the first session, wherein the second session is a session set up of a second core network device; and send a second configuration message for a second public land mobile network, the second core network device being located in the second public land mobile network, wherein the second configuration message comprises a first user identifier, and the first user identifier is usable to scramble scheduling information of service data of the first multicast broadcast service.

13. The apparatus according to claim 12, wherein a data transmission channel of the first core network device in the first session is the same as a data transmission channel of the second core network device in the second session.

14. The apparatus according to claim 12, wherein the first identifier is a first service identifier corresponding to the first multicast broadcast service in a first public land mobile network, a first network service identifier, or a first internet protocol (IP) multicast group address, the first core network device being located in the first public land mobile network.

15. The apparatus according to claim 12, wherein the first identifier is a first public identifier allocated by a service server to the first multicast broadcast service.

16. The apparatus according to claim 12, wherein the one or more processors is further configured to execute the non-transitory instructions to thereby further cause the apparatus to:

send a first message to the first core network device in response to determining that the second core network device stops transmitting service data of the first multicast broadcast service, wherein the first message is useable to indicate setting to set up the first session.

17. The apparatus according to claim 12, wherein the one or more processors is further configured to execute the non-transitory instructions to thereby further cause the apparatus to:

send a first configuration message for a first public land mobile network, the first core network device being located in the first public land mobile network, wherein the first configuration message comprises the first user identifier.

18. An apparatus, comprising:

one or more processors and a memory, wherein the memory is configured to store non-transitory instructions, and the one or more processors are configured to execute the non-transitory instructions to thereby cause the apparatus to:

send a first session setup request to an access network device, wherein the first session setup request is usable to request to set up a first session corresponding to a first multicast broadcast service, and the first session setup request comprises a first identifier corresponding to the first multicast broadcast service;

receive a first session setup response from the access network device, wherein the first session setup response comprises first indication information, and the first indication information is usable to indicate that a multicast broadcast service corresponding to the first session is the same as a multicast broadcast service corresponding to a second session; and determine not to send service data of the first multicast broadcast service to the access network device.

19. The apparatus according to claim 18, wherein a data transmission channel between the access network device and a first core network device in the first session is the same as a data transmission channel between the access network device and a second core network device in the second session.

20. The apparatus according to claim 18, wherein the first identifier is a first service identifier corresponding to the first multicast broadcast service in a first public land mobile network, a first network service identifier, or a first internet protocol (IP) multicast group address, a first core network device being located in the first public land mobile network.

* * * * *